United States Patent
Frederiksen et al.

(10) Patent No.: US 8,895,208 B2
(45) Date of Patent: Nov. 25, 2014

(54) MANUFACTURE AND CALIBRATION PROCESS FOR AN INTERCONNECT FOR A FUEL CELL OR A CELL STACK

(75) Inventors: Casper Buchholtz Frederiksen, Tikøb (DK); Cliver Klitholm, Søborg (DK)

(73) Assignee: Topsoe Fuel Cell A/S, Lyngby (DK)

( * ) Notice: Subject to any disclaimer, the term of this patent is extended or adjusted under 35 U.S.C. 154(b) by 249 days.

(21) Appl. No.: 13/513,754

(22) PCT Filed: Dec. 8, 2010

(86) PCT No.: PCT/EP2010/007463
§ 371 (c)(1), (2), (4) Date: Jun. 4, 2012

(87) PCT Pub. No.: WO2011/076342
PCT Pub. Date: Jun. 30, 2011

(65) Prior Publication Data
US 2012/0264033 A1    Oct. 18, 2012

(30) Foreign Application Priority Data
Dec. 22, 2009 (DK) .................. 2009 01370

(51) Int. Cl.
*H01M 8/00* (2006.01)
*H01M 8/02* (2006.01)
*H01M 8/10* (2006.01)
*H01M 8/24* (2006.01)

(52) U.S. Cl.
CPC .............. *H01M 8/0206* (2013.01); *Y02E 60/50* (2013.01); *H01M 8/2425* (2013.01); *H01M 8/0254* (2013.01); *H01M 8/0297* (2013.01); *Y02E 60/523* (2013.01); *H01M 8/026* (2013.01)
USPC ............ 429/535; 429/507; 429/470; 429/491

(58) Field of Classification Search
USPC ......... 429/535, 420, 483, 444, 440, 507, 491, 429/470; 427/115; 419/1, 28
See application file for complete search history.

(56) References Cited

U.S. PATENT DOCUMENTS

| | | |
|---|---|---|
| 2007/0037033 A1 | 2/2007 | Chiba et al. |
| 2008/0199738 A1* | 8/2008 | Perry et al. ............ 429/12 |
| 2008/0199739 A1 | 8/2008 | Clarke et al. |
| 2008/0280186 A1 | 11/2008 | Iwanschitz et al. |
| 2009/0081520 A1 | 3/2009 | Seido et al. |

FOREIGN PATENT DOCUMENTS

| | | | |
|---|---|---|---|
| CA | 2 558 801 A1 | 6/2003 | |
| EP | 0 629 015 A1 | 12/1994 | |
| EP | 1 300 901 A2 | 4/2003 | |
| EP | 1 850 412 A1 | 10/2007 | |
| JP | 2000-317531 A | 11/2000 | |
| JP | 2003-249238 A | 9/2003 | |
| JP | 2006-120497 A | 5/2006 | |
| WO | WO-2008/089977 A1 * | 7/2008 | .............. H01M 8/04 |

* cited by examiner

Primary Examiner — Kenneth Douyette
(74) *Attorney, Agent, or Firm* — Dickstein Shapiro LLP

(57) ABSTRACT

The manufacture and calibration of an interconnect for a fuel cell ensures contact in all contact points between the interconnect and the adjacent electrodes.

5 Claims, 4 Drawing Sheets

PRIOR ART

MANUFACTURE AND CALIBRATION PROCESS FOR AN INTERCONNECT FOR A FUEL CELL OR A CELL STACK

FIELD OF THE INVENTION

The invention relates to the manufacture and in particular to the calibration of an interconnect for a fuel cell, in particular a high temperature fuel cell.

BACKGROUND OF THE INVENTION

In the following the invention will be explained in relation to a Solid Oxide Fuel Cell. The interconnect according to the invention can, however, also be used for other types of fuel cells such as Polymer Electrolyte Fuel cells (PEM) or a Direct Methanol Fuel Cell (DMFC).

A Solid Oxide Fuel Cell (SOFC) comprises a solid electrolyte that enables the conduction of oxygen ions, a cathode where oxygen is reduced to oxygen ions and an anode where hydrogen is oxidised. The overall reaction in a SOFC is that hydrogen and oxygen electrochemically react to produce electricity, heat and water. In order to produce the required hydrogen, the anode normally possesses catalytic activity for the steam reforming of hydrocarbons, particularly natural gas, whereby hydrogen, carbon dioxide and carbon monoxide are generated. Steam reforming of methane, the main component of natural gas, can be described by the following equations:

$$CH_4 + H_2O \leftrightarrow CO + 3H_2$$

$$CH_4 + CO_2 \leftrightarrow 2CO + 2H_2$$

$$CO + H_2O \leftrightarrow CO_2 + H_2$$

During operation an oxidant such as air is supplied to the solid oxide fuel cell in the cathode region. Fuel such as hydrogen is supplied in the anode region of the fuel cell. Alternatively, a hydrocarbon fuel such as methane is supplied in the anode region, where it is converted to hydrogen and carbon oxides by the above reactions. Hydrogen passes through the porous anode and reacts at the anode/-electrolyte interface with oxygen ions generated on the cathode side that have diffused through the electrolyte. Oxygen ions are created in the cathode side with an input of electrons from the external electrical circuit of the cell.

To increase voltage, several cell units are assembled to form a stack and are linked together by interconnects. Interconnects serve as a gas barrier to separate the anode (fuel) and cathode (air/oxygen) sides of adjacent cell units, and at the same time they enable current conduction between the adjacent cells, i.e. between an anode of one cell with a surplus of electrons and a cathode of a neighbouring cell needing electrons for the reduction process. Further, interconnects are normally provided with a plurality of flow paths for the passage of reactant gasses: fuel gas on one side of the interconnect and oxidant gas on the opposite side.

US 20040219423 describes an internal manifolding interconnect made from for instance a stainless steel metal sheet with a thickness of 0.1-2 mm. The sheet can be stamped to provide raised ridges and/or dimples defining the flow paths on both sides of the interconnect.

EP 1300901 describes interconnects where plastic deformation is used to obtain good electrical contact.

EP 1444749 describes how it is preferred to have current collectors/distributors reaching a plastic-type deformation comprised between 30% and 40% of their initial thickness once the assembling is completed. In this way, a uniform contact pressure close to the optimum operation condition is safely established.

U.S. Pat. No. 6,605,381 describes how another layer can be added between the outside layer and the projecting ribs of the current collector plate. The purpose for such a layer consists of keeping the electric contact resistance to the channel structure as low as possible. For this, the layer could be deformable by plasticity or elasticity thereby allowing that the dimensional tolerances of the current collector plates or, in the case of an arrangement in a fuel cell stack, of the bipolar plates are compensated for and the current collection from the gas diffusion structure can occur evenly.

SUMMARY OF THE INVENTION

It is an object of the invention to provide a process for the manufacture and calibration of an interconnect for a fuel cell stack which provides electrical and mechanical contact of good quality all over the active area between the electrodes and their adjacent interconnect.

It is an object of the invention to provide a process for the manufacture and calibration of an interconnect which allows increased production tolerances on dimensions and shapes for the components in the fuel cell and the fuel cell stack.

It is an object of the invention to provide a process for the manufacture and calibration of an interconnect which provides low tolerances on dimensions and shapes of the interconnect.

It is an object of the invention to provide a process for the manufacture and calibration of an interconnect which lowers the production costs for the interconnect, the fuel cell and the fuel cell stack.

It is an object of the invention to provide a process for the manufacture and calibration of an interconnect which increases the performance and the life time of the fuel cell and the fuel cell stack.

It is an object of the invention to provide a process for the manufacture and calibration of an interconnect which lowers the risk of malfunction of a fuel cell and a fuel cell stack.

These and other objects are achieved by the invention as described below.

Accordingly, a process for the manufacture and calibration of an interconnect is provided, especially for solid oxide fuel cells, but also potentially to other fuel cells such as PEM and DMFC.

The interconnect is made of metal sheet and comprises a first oxidant side and opposite the oxidant side a second fuel side. The first oxidant side contains a plurality of oxidant gas flow paths and the fuel side contains a plurality of fuel gas flow paths. It would be understood that the oxidant side and fuel side of the interconnect correspond, respectively, to two neighbouring cells cathode and anode side. Thus, a first side (face) of the interconnect defines the oxidant side and the opposite side (face) defines the fuel side. The oxidant and fuel gas flow paths are open at both ends and have one or more flow inlets and flow outlets which can be in the form of aperture(s) in the interconnect in case of internal manifolding or formed on a part of the edge of the interconnect in case of external manifolding. To ensure electrical efficiency and minimized internal electrical resistance in the electrolyte, electrodes and the interconnect itself, the interconnect also has an array of protruding electrically conducting contact points distributed over the whole interconnect area. A balance is sought to have as many contact points with as little internal distance as possible and at the same time use as little area of the interconnect for contact points as possible, so the most area is used for flow paths, that is, can be active. It is also important that the contact points have good electrical contact to the neighbouring electrode, thus the contact should be held against the neighbouring electrode with a minimum force.

As the interconnect according to the present invention is made of metal sheet, the protrusions can be made by shaping the metal sheet by any known process such as stamping, pressing, deep drawing or the like. At least three levels of the interconnect are then defined: a mid-level is defined by the metal sheet before any deformation is performed; the first level is defined as the level from the surface of the un-deformed first side of the metal sheet interconnect to the top of the protrusions on the first side of the interconnect; and the second level is defined as the level from the surface of the un-deformed second side of the interconnect to the top of the protrusions on the second side of the interconnect. The flow paths on the first side are formed between the protrusions on the first side of the interconnect and the flow paths on the second side of the interconnect are formed between the protrusions on the second side.

The total thickness of the interconnect is defined as the metal sheet material thickness plus the height of the protrusions on the first side in the first level plus the height of the protrusions on the second side in the second level of the interconnect. The metal sheet material thickness can be in a wide range depending on the context, preferably it is in the span from 50 to 1000 µm, preferably between 50 and 500 µm, preferably from 200 to 300 µm. The metal can be any suitable kind and of any suitable alloy, such as chrome steel, ferritic stainless steel, austenitic stainless steel, nickel based alloys, nickel, a range of noble metals and oxide dispersion strengthened alloys.

An advantage of the at least three-layer design of the interconnect according to the present invention is that the protrusions can be designed to the conditions on each side of the interconnect independently. In the example where linear flow is desired on the first side of the interconnect and substantially serpentine flow is desired on the second side of the interconnect, advantageously the protruding contact points on the first side can comprise discrete points, whilst on the second side the protruding contact points can comprise oblong ridges or vice versa.

The invention comprises a process for manufacturing an interconnect according to the preceding description. A metal sheet is provided of the materials mentioned or any other metal suitable for plastic deformation. Then, protrusions are pressed in a first and a second layer of the metal sheet adjacent to the mid level of the metal sheet defined by the metal sheet prior to the pressing process. The pressing process plastically deforms the metal sheet such that the protrusions pressed into the two layers will remain after the pressing process is finished. The protrusions are pressed into the two layers to an excess dimension, i.e. an excess protrusion height above the mid level of the metal surface. The excess dimension is preferably within the range of 5 µm to 5000 µm, preferably within the range of 50 µm to 2000 µm, preferably within the range of 200 µm to 1500 µm, preferably within the range of 700 µm to 1300 µm.

In an embodiment of the invention, the metal sheet will after the initial pressing process (where the protrusions are formed and has the excess dimension) be assembled with one or more of the additional layers of a fuel cell or in a further embodiment a fuel cell stack, such as electrodes (anode and cathode), contact layers, electrolytes, spacers, gaskets, current collectors, end plates etc, before it is exposed to a calibration step. In this embodiment, the assembled layers may be heated prior to the calibration.

Heating of the metal interconnect and the exposure to a compression force from a calibration press will lead to controlled creep of the metal interconnect, in particular the protrusions of the interconnect. Each protrusion of the interconnect is supposed to be in contact with its adjacent electrode of the fuel cell. In reality, due to variation in dimensions and tolerances, some protrusions will have more contact to the electrodes than others and yet some protrusions will not have contact at all, when at first assembled with the layers of a fuel cell and a fuel cell stack. However, according to the invention, when assembling the pressed interconnect with the rest of the fuel cell layers, heating up the total assembly and compressing the cell or cell stack assembly by exposing it to a compression force during the calibrating step, each protrusion will experience the necessary amount of creep to ensure that each protrusion obtains good contact to the adjacent electrode.

In some fuel cell stacks loss of contact is supposed to cause malfunction as loss of voltage in one or more cells. Creep in interconnects could be the cause. The environment in which the interconnect is located, can cause creep. Specifically the temperature and the force applied on interconnects is of great importance for creep behaviour. An example related to one of the interconnect material candidates: Crofer 22 APU from ThyssenKrupp VDM. In this material at a temperature of 700° C. the internal stresses should be kept below 7 N/mm$^2$ to avoid creep rupture within 10,000 hours, and below 20 N/mm$^2$ to avoid rupture within 20 hours. This is a very low mechanical stress compared to stresses allowed dimensioning steel components working at room temperatures. The stacks maximum working temperature is calculated to be in the region of 825° C. which presumably will lower the creep stress limits even more.

During operation of a fuel cell stack, creep is not considered to be an advantage, since it is supposed to cause loss of contact. However during stack "birth", the stack conditioning where the whole assembly of the fuel cell stack is heated and exposed to compression, a controlled amount of creep is according to the present invention exploited as an advantage in order to bring all protruding contact points in contact with the anode and cathode contact layers.

Considering the interconnect contact points, then theoretically one of the contact points will be higher than the others. If no flexibility was present in the system this contact point would, as the very first and only contact point, hit the cell contact layer during stack conditioning and prevent all the rest of the contact points of the interconnect to hit the contact layer of the cell and create an evenly distributed contact between the interconnect and the cell. This is of course not the case in the "real world" some flexibility is present in the system like elastic flexibility of stack components, porous contact layers giving way for the highest interconnect contact points etc. But there is no proven "built in" function ensuring contact for all contact points to a certain level and quality. Creep in the height of the highest contact points on the interconnect during stack conditioning provides this feature. If the contact points are all able to creep to a certain extent during stack conditioning, then the individual contact point will be adapted to obtain contact in its actual situation.

In a SOFC assembly multiple cells are typically stacked in electrical series connection with interconnects in between the cells. The purpose of the interconnects is to keep anode and cathode gasses separated and to establish electrical contact from one cell in the assembly to the next. This particular contact between a cell and the adjacent interconnect normally has to be established, and evenly distributed, all over an area which in size corresponds to the electrochemical active area (later on referred to as active area) of the cell. Because of dimensional variations, and also variations in the shape of the cells and interconnects, this contact may vary in quality in an unpredictable way resulting in little or even no contact between a certain cell and the adjacent interconnect in smaller or larger parts of the active area.

This invention provides a solution for achieving contact of good quality all over the active area between the cell and the adjacent interconnect, exploiting the creep behaviour of certain materials applied for interconnects.

During stack conditioning the stack assembly is heated to high temperatures. When carefully choosing and shaping materials for interconnects that exhibits creep behaviour within these temperatures, the achieved amount of deformation by creep can even out the above mentioned variations in shape and dimensions. It is of course necessary to mention that deformation by creep requires a mechanical load matching the creep behaviour of the interconnect and distributed evenly over- and normal to the active area, applied to press the cell against the adjacent interconnect. The load may be a general load working on the entire SOFC assembly, propagating through- and affects all the cells and interconnects.

During the stack conditioning, carried out under the above mentioned temperature, load and interconnect creep behaviour conditions and the creep deformation of the interconnects will cause those areas within the active area that initially have good mechanical contact to creep first and to allow areas that initially have low or no contact to achieve this contact.

The results of this invention can also be exploited for allowing increased production tolerances on dimensions and shapes for the components in the SOFC assembly. The creep behaviour of the interconnects during stack conditioning, as described above, will even out the tolerances on dimensions and shape.

In an other embodiment of the invention, the metal sheet is provided to a calibrating press which compresses all the protrusions to an even final dimension. Hence, this embodiment of the invention provides an interconnect where the thickness of the metal sheet including the protrusions on both sides is calibrated and has fine tolerances before the interconnect is assembled with the rest of the cell stack components. This operation can be performed when the interconnect is heated, but also when the interconnect has ambient temperature.

The metal sheet may prior to the manufacturing be coated with a protective layer to protect the interconnect from the operating conditions, or the interconnect may be coated after the manufacturing process.

FEATURES OF THE INVENTION

1. Process for the manufacture of an interconnect for a fuel cell or a fuel cell stack, comprising the steps
    providing at least one metal sheet to a press
    pressing protrusions on both sides of the at least one metal sheet, thereby forming contact points, lines or areas on both sides of the at least one metal sheet, wherein said protrusions are pressed to an excess dimension, an excess protrusion height above the at least one metal sheet surface on either side of the at least one metal sheet
    providing said at least one metal sheet with excess dimensioned protrusions to a calibrating press
    performing a calibration step wherein the at least one metal sheet is compressed in the calibrating press, whereby said protrusions are compressed to their final dimension smaller than said excess dimension.

2. Process according to feature 1, wherein the calibrating press compresses said protrusions to an even final dimension, whereby the thickness of the at least one metal sheet including protrusions is calibrated.

3. Process according to any of the preceding features, wherein the thickness of the at least one metal sheet including protrusions has a tolerance of +/−40 μm, preferably +/−20 μm, preferably +/−8 μm, preferably +/−2 μm.

4. Process according to any of the preceding features, wherein the protrusions are plastically deformed by said compression by the calibrating press.

5. Process according to feature 1, wherein said at least one metal sheet with excess dimensioned protrusions is/are assembled with layers comprising anode, cathode and electrolyte to form a fuel cell or a plurality of stacked fuel cells forming a cell stack and heating the assembled cell or cell stack prior to the calibrating step.

6. Process according to feature 5 wherein the assembled cell or cell stack is heated to a temperature above 600° C., preferably above 850° C., preferably a temperature between 875° and 925° C. prior to the calibrating step.

7. Process according to any of the features 5 or 6, wherein the calibrating step is performed by applying a compression force to the heated fuel cell or fuel stack during an amount of time, whereby the excess dimensioned protrusions of the at least one metal sheet creep to reach the final dimension, thereby obtaining contact to the adjacent layers of the cell or the cell stack.

8. Process according to any of the features 5 to 7, wherein said compression force is 0.0001 to 350 N/mm$^2$, preferably 0.01 to 100 N/mm$^2$, preferably 0.05 to 3 N/mm$^2$ and said amount of time is 0.5 to 10 hours, preferably 1 to 5 hours, preferably 1 to 3 hours.

9. Fuel cell or a plurality of fuel cells in a cell stack comprising at least one metal sheet interconnect manufactured by a process according to any of the features 1 to 8.

10. Fuel cell or a plurality of fuel cells in a fuel cell stack according to feature 9 wherein said fuel cell or plurality of fuel cells is a Solid Oxide Fuel Cell.

BRIEF DESCRIPTION OF THE DRAWINGS

The invention is further illustrated by the accompanying drawings showing examples of embodiments of the invention.

FIGS. 6a and 6b are photos of an interconnect after controlled creep, 6b is a close-up of an area of 6a.

POSITION NUMBER OVERVIEW

| | |
|---|---|
| 100, 200, 300. | Fuel cell stack |
| 101, 201, 301, 501. | Interconnect |
| 102, 202, 302. | Electrode |
| 103. | Contact layer |
| 104, 204, 304. | "Good" Contact point |
| 105, 205. | "Poor/NO" Contact point |

| | |
|---|---|
| 106, 206, 306. | Reactant gas channel |
| 107. | Spacer |
| 108. | Gasket |

DETAILED DESCRIPTION

Figure 1:
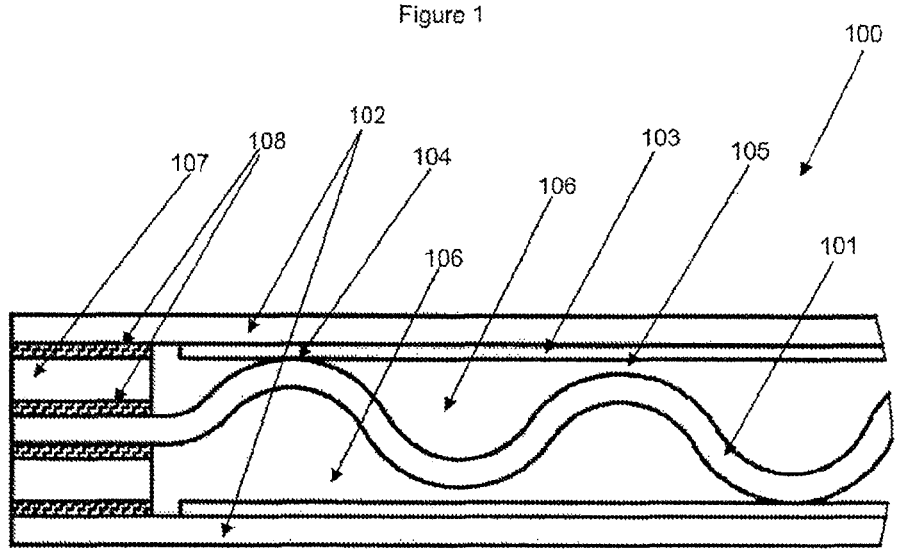
FIG. 1 is a cross sectional view of a part of a fuel cell stack.

FIG. 1 shows a sectional view of a part of a fuel cell (100) according to state of the art. Shown are two electrodes, (the anode and the cathode) (102) which are separated by and in contact with the interconnect (101). The interconnect provides electrical and mechanical contact in the contact points (104) of the protrusions, between the anode and the cathode and further the areas of the interconnect between the protrusions provides reactant gas channels (106) for the anode reactant gas and the cathode reactant gas. Towards the edge of the interconnect and the electrodes, the layers are sealed gas tight by means of spacers (107) and gaskets (108) as known in the art, which is not the essential part of the present invention. Despite the possible flexibility of one or more layers of the fuel cell assembly and despite the presence of a contact layer (103), not all protrusions establish good contact between the interconnect (101) and the electrodes (102). Due to a range of possible problems such as variation in dimensions, tolerances, materials and production processes, some protrusions remain without contact to the electrodes, as can be seen in position 105.

Figure 2:
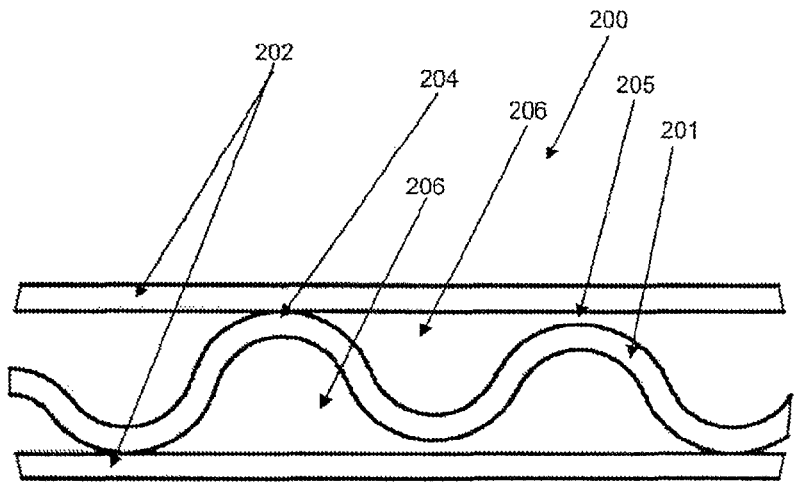
FIG. 2 is a simplified cross sectional view of a part of a fuel cell stack before calibration.

FIG. 2 shows this problem (205) in a more simplified view, where the contact layer is shown integrated with the electrodes (202) and the edge sealing members are omitted.

Figure 3:
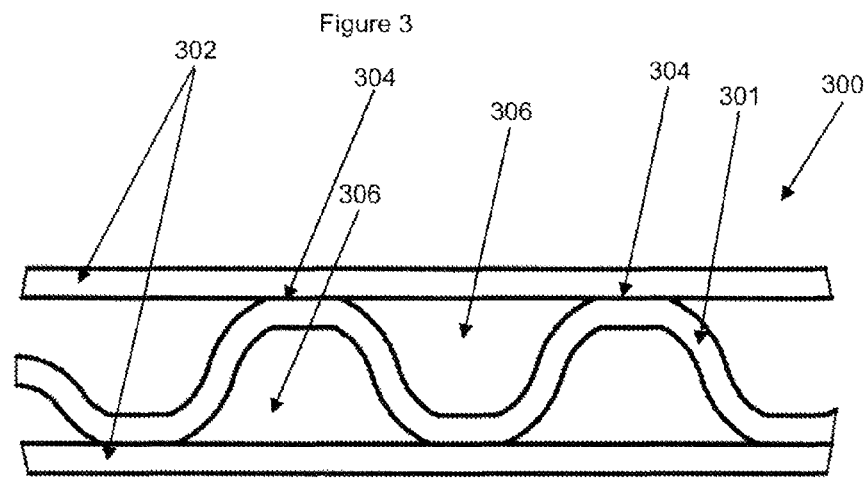
FIG. 3 is a simplified cross sectional view of a part of a fuel cell stack after calibration.

In FIG. 3 a fuel cell (300) manufactured according to the invention is shown. All protrusions have good contact to the electrodes (304). This is obtained by either of the two main embodiments of the invention: One embodiment has the steps of pressing a metal sheet to the shape of an interconnect having protrusions on both sides with an excess dimension such that each protrusion is higher than its final height; assembling the layers, including the pre-pressed interconnect, of the fuel cell to at least one fuel cell or a whole stack of fuel cells, heating up and compressing the fuel cell or fuel cell stack in a calibrating press such that the metal interconnect is subjected to controlled creep, whereby each of said protrusions are compressed to their final dimension smaller than said excess dimension while obtaining good contact to the adjacent electrodes. Or the other main embodiment, where a metal sheet is pressed to the shape of an interconnect having protrusions on both sides with an excess dimension such that each protrusion is higher than its final height; said pre-pressed metal sheet is then calibrated in a calibrating press, such that all of the protrusions gets their final height within a narrow tolerance and finally assembling the layers, including the calibrated interconnect, of the fuel cell to at least one fuel cell or a whole stack of fuel cells and heating up and compressing the fuel cell or fuel cell stack.

Figure 4:
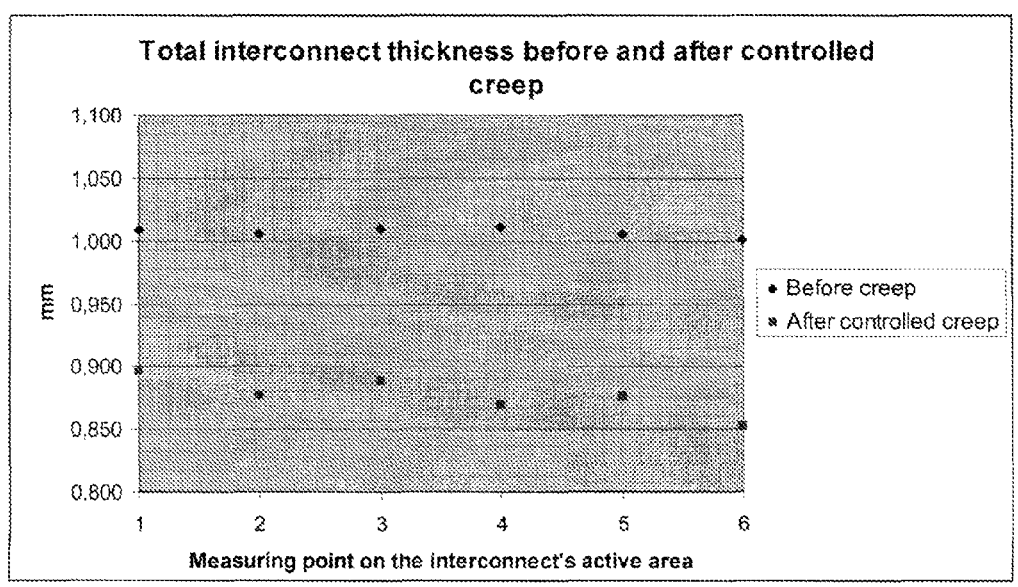
FIG. 4 is a graph showing the total thickness of an interconnect before and after controlled creep.

FIG. 4 is a graph showing the total thickness of an interconnect before and after controlled creep as a result of a creep experiment performed on a cold-pressed interconnect as an example of one embodiment of the invention. The creep of the interconnect has been achieved by exposing the interconnect to temperature, force and timing similar to those applied during stack conditioning where creep is exploited according to this invention. The interconnect in this experiment has been exposed to creep developing force almost evenly distributed over the interconnect protrusions, temperature and timing and the protrusions on each side of the interconnect has been allowed to creep without any other limitations than the protrusions entirely own resistance against creep. During real stack conditioning the amount of creep possible will also be influenced by other components, as spacers and gaskets (as examples) and their variations limiting and varying the creep developing forces exerted on the protrusions. The amount of creep for each protrusion will then be determined as a result of a rather mechanical complex process influenced by different components, their dimensions and variations.

The results from FIG. 4 indicates that with this particular design of an interconnect, and with these particular creep developing parameters, the total amount of creep of the interconnect protrusions is in the region of at least 100 microns. These adapting abilities in the interconnect protrusions, manufactured with an over-height, can according to this invention be exploited to compensate for mechanical dimensional variations of the components in the stack securing good mechanical and electrical contact for each interconnect protrusion. The amount of creep can of course be varied by chancing the design of the interconnect and varying the creep developing parameters. The 6 measuring points of the X-axis of the graph are discreet points distributed over the interconnect protrusions in the interconnects active area. These 6 measuring points have almost the similar value before creep, but show a rather systematic variation after controlled creep. In the present experiment this actually shows how the interconnect is able to adapt to variations of the surrounding components because of the controlled creep, since the force providing mechanics of the experiment have irregularities corresponding to the variations of the six measuring points after creep.

Figure 5A:
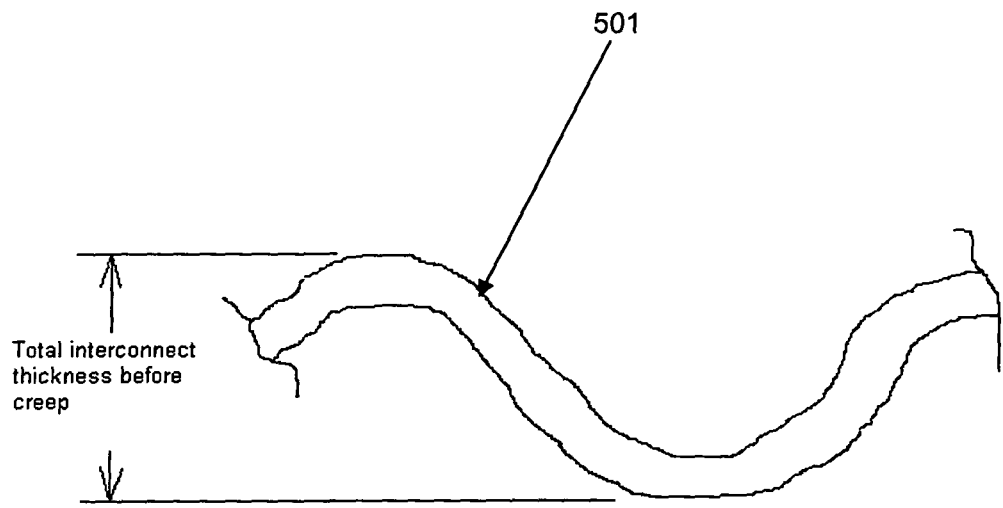
FIGS. 5a and 5b are simplified cross sectional views of an interconnect before and after controlled creep.
Figure 5B:
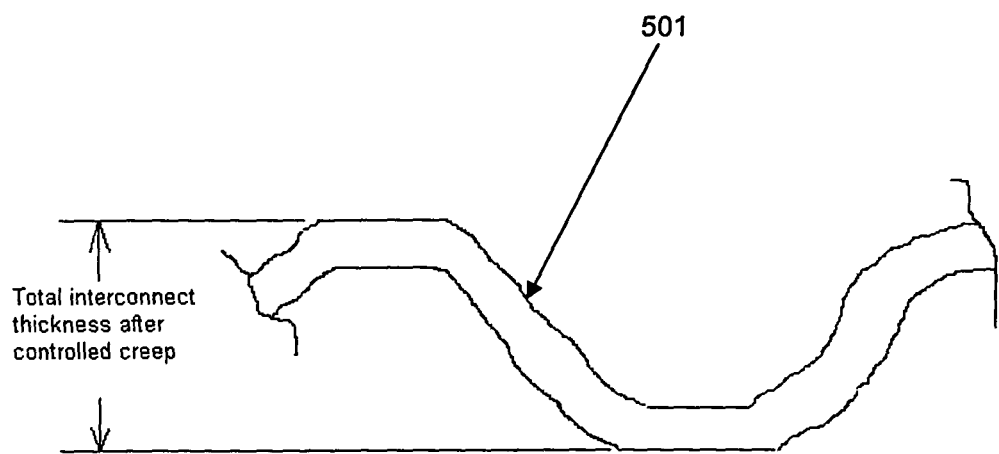

FIG. 5a show the definition of the total thickness of the interconnect before creep and FIG. 5b show the definition of the total thickness of the interconnect after controlled creep as measured in FIG. 4.

Figure 6A:
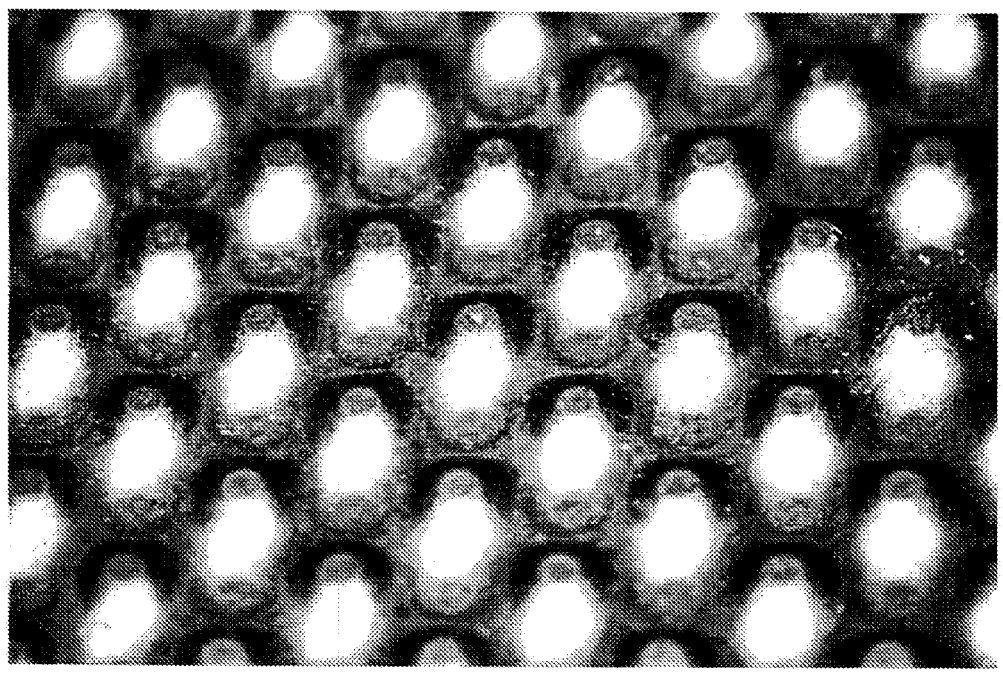
Figure 6B:
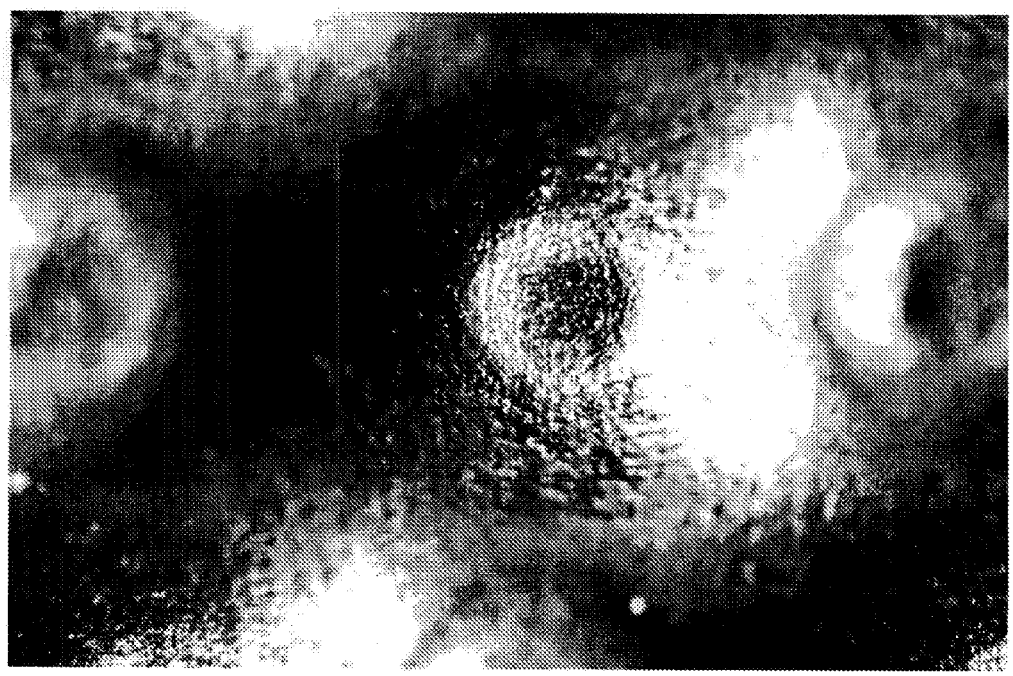

On FIG. 6 an area of an interconnect after controlled creep according to an embodiment of the invention is shown as a photo. The photo 6b is a close-up of a section of 6a. Every "top" of the interconnect is flattened after the creep. Before the creep, the tops were rounded. The tops are flattened due to contact with the neighbouring layer, thus according to the invention, contact in each top point is assured by means of the initial excess dimension of each top and the following controlled creep by increased temperature and contact under a compression force with the neighbouring layers (not shown).

EXAMPLE

Test of Creep in an Interconnect

In order to investigate the possibilities of taking advantage of creep during stack conditioning, a simple investigation was conducted. A special stack was built. The stack consists of 5 interconnects produced from 0.3 mm Crofer 22 APU foil of the type applied in fuel cell stacks. The interconnects were uncoated calibrated in height and annealed for coating. 0.6 mm alumina plates were placed between the interconnects in stead of fuel cells. Top and bottom of the stack was equipped with standard 8 mm top and bottom plates. No spacers or gaskets were applied, in order to obtain the possibility to take the stack components apart without damage after the conditioning procedure was carried out.

This stack was exposed to a standard stack conditioning procedure in the R&D lab, and the purpose was to investigate how much the height of the interconnect would be reduced by creep during the conditioning procedure.

Test Results

The height of the 5 interconnects was measured before and after conditioning procedure at 6 measuring points evenly distributed over the corrugated area by a reproducible pattern, making sure that the measuring at a certain measuring point could be repeated after the conditioning procedure. The results are very much similar for all five interconnects so only the results from interconnect one is listed in FIG. 4. In order to get an impression of the measuring variation compared to the amount of creep, each point has been measured 5 times.

Conclusion

Analyzing the results it would be fair to claim that all five interconnects, in all measuring points and beyond any doubt on measuring variation has exhibited a significant amount of creep during the short period of stack conditioning. The creep varies from minimum 100μ to maximum 200μ. It is obvious to investigate the possibilities of taking advantages of this creep phenomenon. Possible achievements are:

Contact for all contact points of an interconnect
A contribution to stack tolerance robustness
Separation of contact tolerance issues and sealing tolerance issues.
A better quality of contact for all contact points.

EXAMPLE

Cold Calibration of an Interconnect before Assembly

An interconnect having ambient temperature, with protrusions pressed to an excess dimension is provided to a calibration press. Spacers with a thickness equal to the final calibrated protrusion height are provided to each side of the interconnect, positioned on surfaces of the interconnect without protrusions. The surfaces of the press are plane. Depending on the interconnect shape, area and interconnect material, a calibration pressure of 15-50 tons is applied to the interconnect. Accordingly, all protrusions are pressed to an even final calibrated height.

The invention claimed is:

1. A process for the manufacture of an interconnect for a fuel cell or a fuel cell stack, the process comprising the steps of:
   providing at least one metal sheet to a press;
   pressing protrusions on both sides of the at least one metal sheet, thereby forming contact points, lines or areas on both sides of the at least one metal sheet, wherein said protrusions are pressed to an excess dimension, an excess protrusion height above the at least one metal sheet surface on either side of the at least one metal sheet;
   assembling said at least one metal sheet with excess dimensioned protrusions with layers comprising anode, cathode and electrolyte to form a fuel cell or plurality of stacked fuel cells forming a cell stack;
   providing the at least one metal sheet with excess dimensioned protrusions and said layers comprising anode, cathode and electrolyte to a calibrating press; and
   performing a calibration step wherein the assembled cell or cell stack including the at least one metal sheet is heated to a temperature above 850° C. and compressed in the calibrating press during an amount of time of 1 to 3 hours, whereby the excess dimensioned protrusions of the at least one metal sheet are compressed and creep to reach the final dimension smaller than said excess dimension, thereby obtaining contact to the adjacent layers of the cell or the cell stack.

2. The process according to claim 1, wherein the thickness of the at least one metal sheet including protrusions has a tolerance of +/−40 μm.

3. The process according to claim 1, wherein said compression force is 0.0001 to 350 N/mm².

4. A fuel cell or a plurality of fuel cells in a cell stack comprising at least one metal sheet interconnect manufactured by a process according to claim 1.

5. A fuel cell or a plurality of fuel cells in a fuel cell stack according to claim 4, wherein fuel cell or plurality of fuel cells is a Solid Oxide Fuel Cell.

* * * * *